(12) United States Patent
Kracht et al.

(10) Patent No.: US 12,024,338 B2
(45) Date of Patent: Jul. 2, 2024

(54) SUPPORT FOR A WORK OF ART

(71) Applicant: TURTLE B.V., The Hague (NL)

(72) Inventors: Kerstin Annette Kracht, Toddin (DE); Geert Cornelis Pieter Verhoeff, The Hague (NL); Menno Boelsma, The Hague (NL); Mirna Boelsma, The Hague (NL)

(73) Assignee: Turtle B.V., The Hague (NL)

( * ) Notice: Subject to any disclaimer, the term of this patent is extended or adjusted under 35 U.S.C. 154(b) by 21 days.

(21) Appl. No.: 17/506,037

(22) Filed: Oct. 20, 2021

(65) Prior Publication Data

US 2022/0127044 A1 Apr. 28, 2022

(30) Foreign Application Priority Data

Oct. 23, 2020 (NL) ...................................... 2026755

(51) Int. Cl.
| | |
|---|---|
| *B65D 25/24* | (2006.01) |
| *B65D 81/107* | (2006.01) |
| *F16F 7/14* | (2006.01) |

(52) U.S. Cl.
CPC ........... *B65D 25/24* (2013.01); *B65D 81/107* (2013.01); *F16F 7/14* (2013.01)

(58) Field of Classification Search
CPC ...... B65D 25/24; B65D 81/107; B65D 85/30; B65D 2313/02; B65D 81/07; B65D 81/057; F16F 7/14
USPC ............... 206/451, 453, 454, 455, 586, 523; 248/680, 670, 510, 346.07
See application file for complete search history.

(56) References Cited

U.S. PATENT DOCUMENTS

| | | | | |
|---|---|---|---|---|
| 3,307,691 A | * | 3/1967 | Vallebona | B65D 85/48 206/451 |
| 5,518,118 A | * | 5/1996 | Putz | B65D 85/30 206/451 |
| 5,810,171 A | * | 9/1998 | Lee | B65D 81/107 206/320 |
| 5,823,352 A | * | 10/1998 | Mena | B65D 5/4204 206/721 |
| 6,290,217 B1 | | 9/2001 | Schneider et al. | |
| 6,886,692 B2 | * | 5/2005 | Allison | B65D 85/48 229/940 |
| 7,216,765 B2 | * | 5/2007 | Markert | B65D 81/053 206/320 |
| 7,644,820 B2 | * | 1/2010 | Hohne | B65D 81/1275 206/523 |

(Continued)

FOREIGN PATENT DOCUMENTS

| | | | |
|---|---|---|---|
| CN | 205298391 U | * | 6/2016 |
| CN | 206234328 U | * | 6/2017 |

(Continued)

OTHER PUBLICATIONS

Search Report and Written Opinion of NL 2026755; dated Jul. 26, 2021; 10 pgs.

*Primary Examiner* — Kimberly T Wood
(74) *Attorney, Agent, or Firm* — Perilla Knox & Hildebrandt LLP (57) ABSTRACT

The invention is directed to a support for a work of art comprising a base element for fixing the support to an interior wall of a shipping container and a clamping element for clamping the work of art and wherein the base element and the clamping element are fixed to each other by wire rope isolators.

14 Claims, 5 Drawing Sheets

(56) References Cited

U.S. PATENT DOCUMENTS

| | | | |
|---|---|---|---|
| 8,240,473 B2* | 8/2012 | Van Patten | B65D 81/107 |
| | | | 206/451 |
| 10,723,539 B2* | 7/2020 | Van Kralingen | B65D 25/28 |
| 10,836,554 B2* | 11/2020 | Kronkright | F16F 7/14 |
| 2002/0056656 A1* | 5/2002 | Beliveau | B65D 81/057 |
| | | | 206/453 |
| 2007/0131574 A1* | 6/2007 | Aoki | B65D 81/052 |
| | | | 206/521 |
| 2007/0205117 A1* | 9/2007 | Kong | B65D 81/113 |
| | | | 206/96 |
| 2011/0017561 A1* | 1/2011 | Tanaka | E04H 9/0215 |
| | | | 188/266 |
| 2019/0257382 A1* | 8/2019 | Arias-Acosta | F16F 15/0235 |

FOREIGN PATENT DOCUMENTS

| | | | | |
|---|---|---|---|---|
| CN | 109573335 A | | 4/2019 | |
| CN | 110060709 A | * | 7/2019 | G11B 33/0466 |
| CN | 210423572 U | * | 4/2020 | F16F 15/063 |
| CN | 217328249 U | * | 8/2022 | |
| DE | 8409412 U1 | | 7/1984 | |
| DE | 202020103635 U1 | | 8/2020 | |
| EP | 3365240 B1 | | 6/2020 | |
| WO | WO-2021126031 A1 | * | 6/2021 | B60P 7/16 |

\* cited by examiner

SUPPORT FOR A WORK OF ART

The invention is directed to a support for a work of art comprising a base element for fixing the support to an interior wall of a shipping container.

Such supports are described in applicant's patent EP3365240B1. In this publication a corner element is described which can be connected to an interior wall of a shipping container. The corner element is provided with a seat which can be adjusted in height relative to the interior wall. A work of art is supported by the seat of the corner element. The seat is adjusted in height, i.e. adjusted in the distance from the interior wall of the shipping container and the seat, such that the work of art is fixed between the seat and an opposite interior wall of the closed shipping container. This results in that the work of art will be fixed within the shipping container. However some small movement of the work of art within the shipping container may still occur in use.

DE202020103635U1 describes a support for a work of art comprising a clamping element which is fixed to an interior wall of a shipping container by means of a column with arms. The interior wall of a shipping container is provided with a plurality of openings to connect with the column such that the support itself can be positioned in many different locations on the interior wall.

A disadvantage of the prior art designs is that shocks exercised on the shipping container, for example when handling the shipping container, will be transferred onto the work of art.

The invention is directed to a shipping container which does not have the disadvantages of the prior art shipping container.

This is achieved by a support for a work of art comprising a base element for fixing the support to an interior wall of a shipping container and a clamping element for clamping the work of art and wherein the base element and the clamping element are fixed to each other by wire rope isolators.

Applicant found that the supports according to the invention can mitigate shocks much better than the prior art design. By using wire rope isolators in combination with a clamping element shocks are better absorbed by the shipping container and not or very little transferred to the work of art itself. In part this effect is achieved by the clamping element which fixes the work of art to the support and not between a support and an opposite interior wall of a closed shipping container as in the prior art design.

In this description term upright is used to describe the support as fixed in a shipping container when the work of art is positioned horizontally in the shipping container. This description is not intended to limit the scope of the invention to such an orientation but is merely intended to more clearly disclose the invention.

The base element and the clamping element may be fixed to each other by wire rope isolators in many different ways. Suitably this connection allows the base element and the clamping element to move in six degrees of freedom relative to each other.

The wire rope isolator may be any type of wire rope isolator, such as helical wire rope isolators, circular wire rope isolators and rectangular wire rope isolators. An example of a rectangular wire rope isolator is a square wire rope isolator. A preferred wire rope isolator comprise two mounting blocks, each mounting block provided with two parallel passages for a wire rope which wire rope spaces the blocks apart. The wire rope is secured in the passages to the mounting blocks. The mounting blocks may be rectangular, for example square. An example of such a wire rope isolator is described in U.S. Pat. No. 6,290,217.

The base element and clamping element may have different designs. The base part is preferably releasably connected to an interior wall of a shipping container. An example of such a connection is the connection described in the above referred to DE202020103635U1. The base part may then for example be the column and arms as described in DE202020103635U1 and connected to the clamping element by wire rope isolators.

The base element suitably has a base surface which may be releasably connected to an interior wall of a shipping container. Such a connection may for example be by means of bolts, by the columns of DE202020103635U1 or preferably by means of a by a hook and loop type connection as described in for example EP3365240B1. The hook and loop type connection is preferred because it enables a more precise positioning of the support in the shipping container and this ma more flexible design to accommodate different sized work of arts.

The shape of the base part and the clamping element are similar such that they are easily connected by more than one uniformly shaped wire rope isolator. An example of a suited shape is wherein the base element has a cross-section in the shape of a L and comprises of a base wall part and an upright wall part and wherein the clamping element has a cross-section in the shape of a L and comprises of a base wall part and an upright wall part.

Preferably the base wall part of the base element and the clamping element has a rectangular shape and wherein the upright wall part of the base element and the clamping device has a rectangular shape.

For the above design the distance between the base wall part of the base element and the base wall part of the clamping element is suitably between 1.5 and 12 cm and the distance between the upright wall part of the base element and the upright wall part of the clamping element is suitably between 1.5 and 12 cm. In the resulting space between these walls the wire rope isolator will be present. In addition shock absorbing cushion material, like for example rubber, may be present in this space to avoid that these walls contact when the shipping container is exposed to an extreme shock. In normal operation this cushion material will not fill the entire space between the walls and will be connected to either one or both of the walls.

The base wall part of the base element and the base wall part of the clamping element are fixed to each other by one or more wire rope isolators and wherein the upright wall part of the base element and the upright wall part of the clamping element are fixed to each other by one or more wire rope isolators.

The base wall part of the base element and the base wall part of the clamping element may be fixed to each other by 1 to 5 square wire rope isolators. The upright wall part of the base element and the upright wall part of the clamping element may be fixed to each other by 1 to 5 square wire rope isolators. The number of square wire rope isolators and the properties of the square wire rope isolators in terms of their shock average, vibration average and rated dynamic travel may be easily determined by simulation and/or trial and error.

The clamping element is suited for clamping the work of art. The work of art will typically be an optionally framed 2 dimensional piece of art such as drawings and paintings. The clamping element is suitably adapted to releasably connect differently sized pieces of art and especially differently sized frames of the pieces of art to the clamping element. The clamping element may for example be the clamping element described in DE202020103635U1. For the design discussed above the clamping element is suitably provided with a clamp which may be fixed to the upright wall part of the clamping element at varying distances from the base wall part of the clamping device. By varying the distance from the base wall part of the clamping device to the clamp the side or corner of a piece of art may be clamped or releasably connected to the clamping element. The clamp suitably has means like a screw or bolt to fix the clamp at a chosen distance from the from the base wall part of the clamping device. The clamping element is suitably provided with a cushion material, such as rubber or materials having similar cushion properties, for avoiding damage to the work of art and to even further limit shocks to the work of art.

The support element may be used to support a side of the piece of art. For example circular or round work of arts may be supported by a number of the supports according to the invention. The supports may also be used to support a piece of art having corners. Typically such work of arts have a non-rectangular shape having four corners. The support is suitably used to support the corners and optionally also one or more sides of the rectangular shaped work of art. Suitably the support is adapted for use to support a corner wherein to the base wall part and the upright wall part of the clamping element a third wall part is fixed such to form a corner element to support a corner of a work of art. Preferably the third wall part is releasable fixed to either possible end of the L-shaped clamping element. For example the third wall part may be fixed to either side of a rectangular the upright wall part and a rectangular base wall part of the clamping element. This allows to use the support as a side support or as a corner support. Further it allows corner supports according to the invention to be obtained which in use result in that the upright wall part of the clamping device of all four corner supports are positioned parallel with respect to each other. This results in that the wire rope isolators of all supports are oriented in the same way which is beneficial for achieving the damping.

The invention is also directed to the use of the supports in a shipping container for transporting one or more works of art. Typically one work of art is transported in one shipping container using the supports of this invention. The number and positions of the supports used for one piece of work of art may vary and is for example dependent on the weight, size and type of the work of art and/or the size of the optional frame and the type of wire rope isolators are used. For a fixed embodiment for the support it is found possible to determine the optimal number of supports as a function of the size, weight and type of the work of art. This makes it possible for a user to easily determine the optimal configuration when packaging a work of art. For example by making use of a table providing the required number of supports as a function of size, weight and type of the work of art.

The invention is also directed to a shipping container comprising a work of art which is fixed within the shipping container by means of more than one supports according to the invention. The shipping container may be made of any material. For example the shipping container may be a wooden container specially constructed for one work of art and for one shipping movement. The shipping container may also be a reusable shipping container, for example a reusable shipping container made of wood. Preferably the shipping container is made of fibre reinforced polyester further comprising a structural rigid foam core because these shipping containers are very stiff. This further reduces the transfer of shocks to the work of art. Such a shipping container is for example described in EP336524061.

The invention is also directed to a shipping container suited for transporting works of art, typically one work of art, comprising:
an enclosing section comprising a flat rectangular wall segment and four wall sections adjoining said flat wall segment, wherein the flat wall segment and the four wall sections define a space for the works of art to be transported,
a cover section comprising a flat rectangular wall,
retaining means to secure the cover section to the wall sections of the enclosing section and
three or more support elements according to the invention wherein the base element of the support elements is fixed to the flat rectangular wall segment and wherein the clamping element of the support is spaced apart from the cover section when the cover section is secured to the wall sections.

The invention shall be illustrated by the following non-limiting figures.

Figure 1:
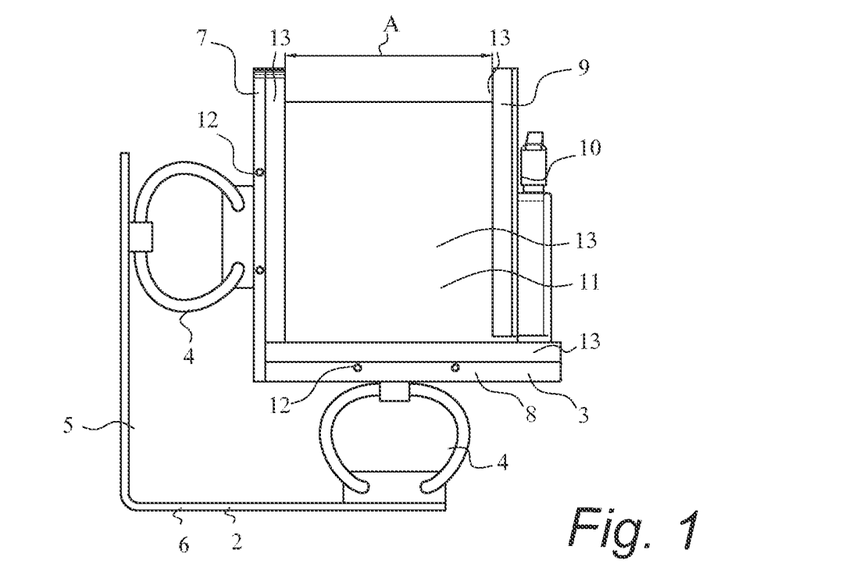
Figure 2:
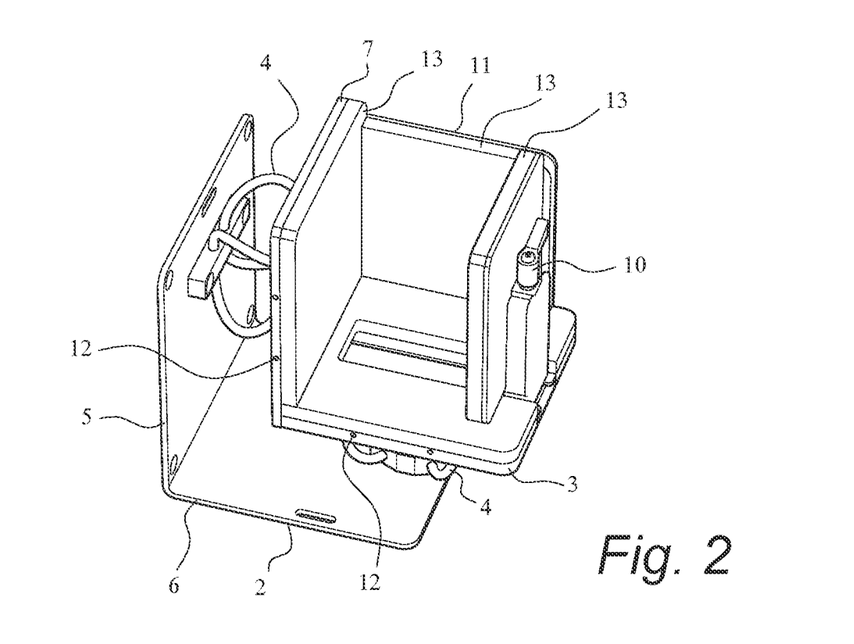

FIGS. 1 and 2 show a corner support (1) provided with a base element (2) and a clamping element (3). The base element (2) and the clamping element (3) are fixed to each other by two rectangular wire rope isolators (4). The two wire rope isolators (4) allow the base element (2) and the clamping element (3) can move in six degrees of freedom relative to each other. The base element (2) has a cross-section in the shape of a L and consists of a rectangular base wall part (5) and an upright rectangular wall part (6). The clamping element (3) has a cross-section in the shape of a L and consist of a rectangular base wall part (7) and an upright rectangular wall part (8). As shown the base wall part (5) of the base element (2) and the base wall part (7) of the clamping element (3) are fixed to each other by one square wire rope isolator (4). The upright wall part (6) of the base element (2) and the upright wall part (8) of the clamping element (3) are fixed to each other by one square wire rope isolator. The clamping element (3) is provided with a clamp (9) as moveably fixed to the upright wall part (8) of the clamping element (3). Clamp (9) may be fixed to the upright wall part (8) of the clamping element (3) at varying positions resulting in varying distances (A) between the clamp (9) and the base wall part (7) of the clamping device. The clamp (9) may be fixed by locking mechanism (10). Between the clamp (9) and the base wall part (7) of the clamping device a corner of a work of art may thus be fixed. To the base wall part (7) and the upright wall part (8) of the clamping element (3) a third wall part (11) is fixed such to form a corner element to support a corner of a work of art. This third wall part (11) can be disconnected and reconnected at the other end of the clamping element by means of bolts for which openings (12) are shown. The clamp (9) and the sides of wall parts (7), (8) and (11) which face the work of art are provided with a foam layer (13).

Figure 3:
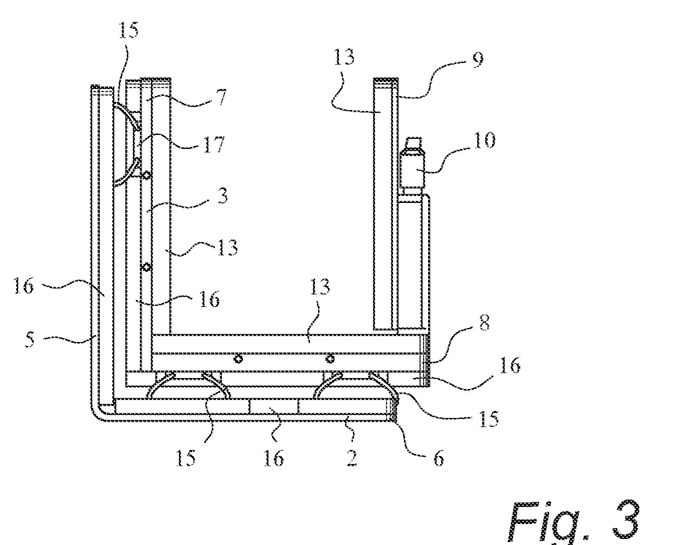
Figure 4:
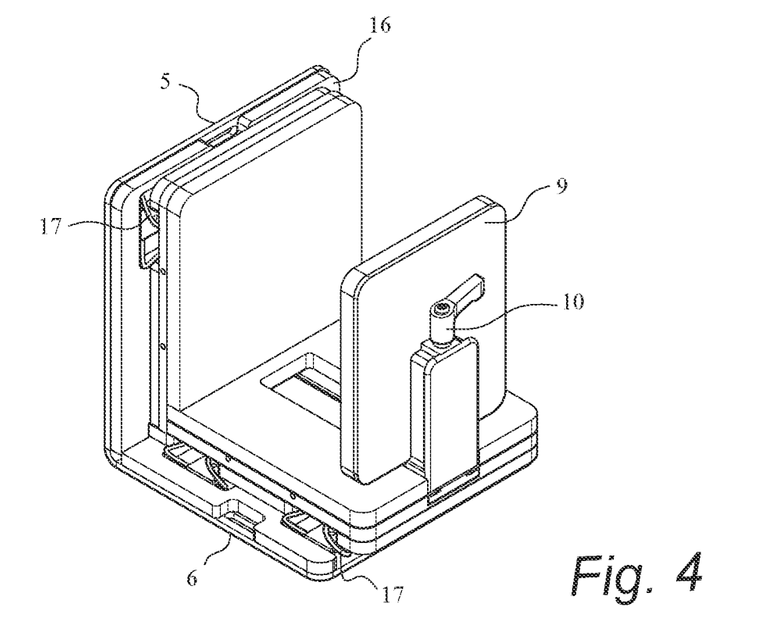

FIGS. 3 and 4 show a side support (14) not provided with a third wall part (11) as in FIGS. 1-2. The same reference numbers refer to the same parts of the support. As shown the base wall part (5) of the base element (2) and the base wall part (7) of the clamping element (3) are fixed to each other by two square wire rope isolators (15). The upright wall part (6) of the base element (2) and the upright wall so part (8) of the clamping element (3) are fixed to each other by four square wire rope isolators (15). A foam layer (16) as a shock absorbing cushion material is provided to the on the be present in this space is fixed to the base wall part (5) of the base element (2), to the base wall part (7) of the clamping element (3), to upright wall part (6) of the base element (2) and to the upright wall part (8) of the clamping element. The layers as fixed to the walls face each other and are spaced apart such that under normal use these layers do not touch. These layers are meant to only contact when the shipping container is exposed to an extreme shock thereby avoiding that the walls themselves make contact. As shown the layers (16) have open areas (17) for the square wire loop isolators (15) such that these are directly fixed to the walls.

Figure 5:
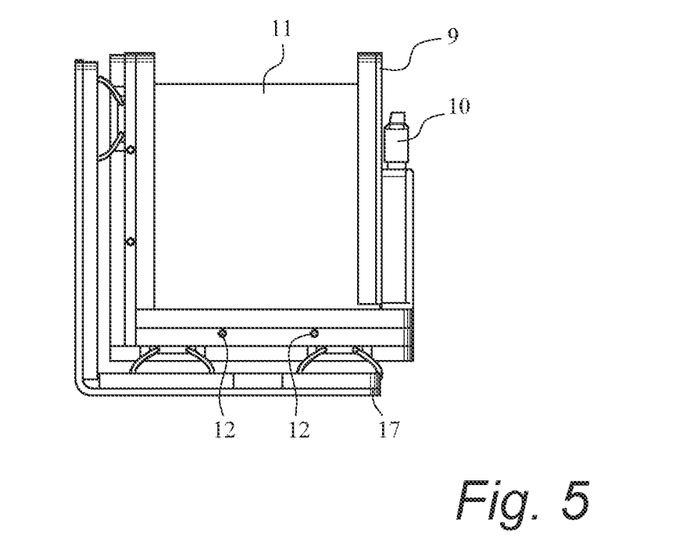
Figure 6:
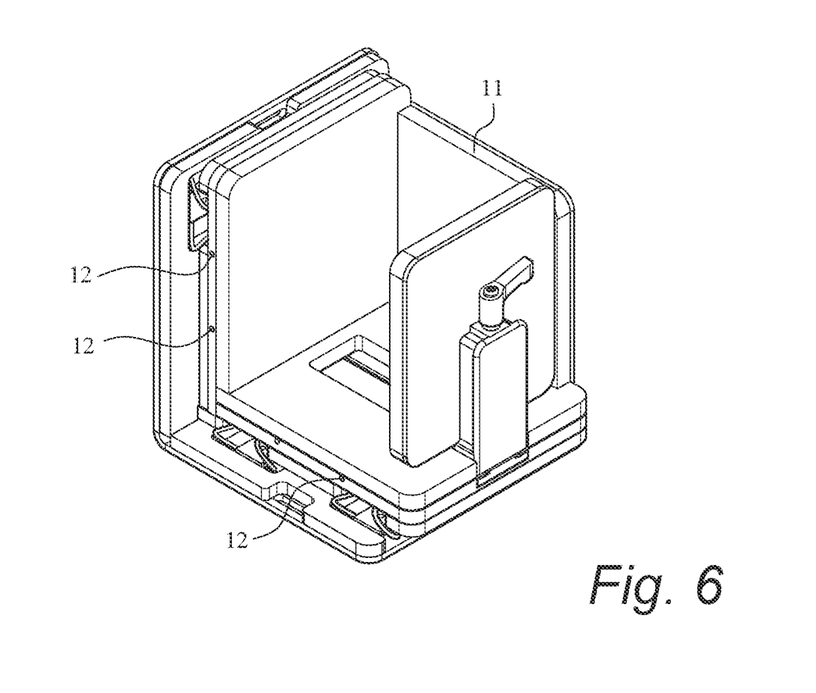

FIGS. 5 and 6 show the support according to FIGS. 3 and 4 and provided with a third wall part (11) making this support a corner support (17). This third wall part (11) can be disconnected and reconnected at the other end of the clamping element (3) by means of bolts for which openings (12) are shown.

Figure 7:
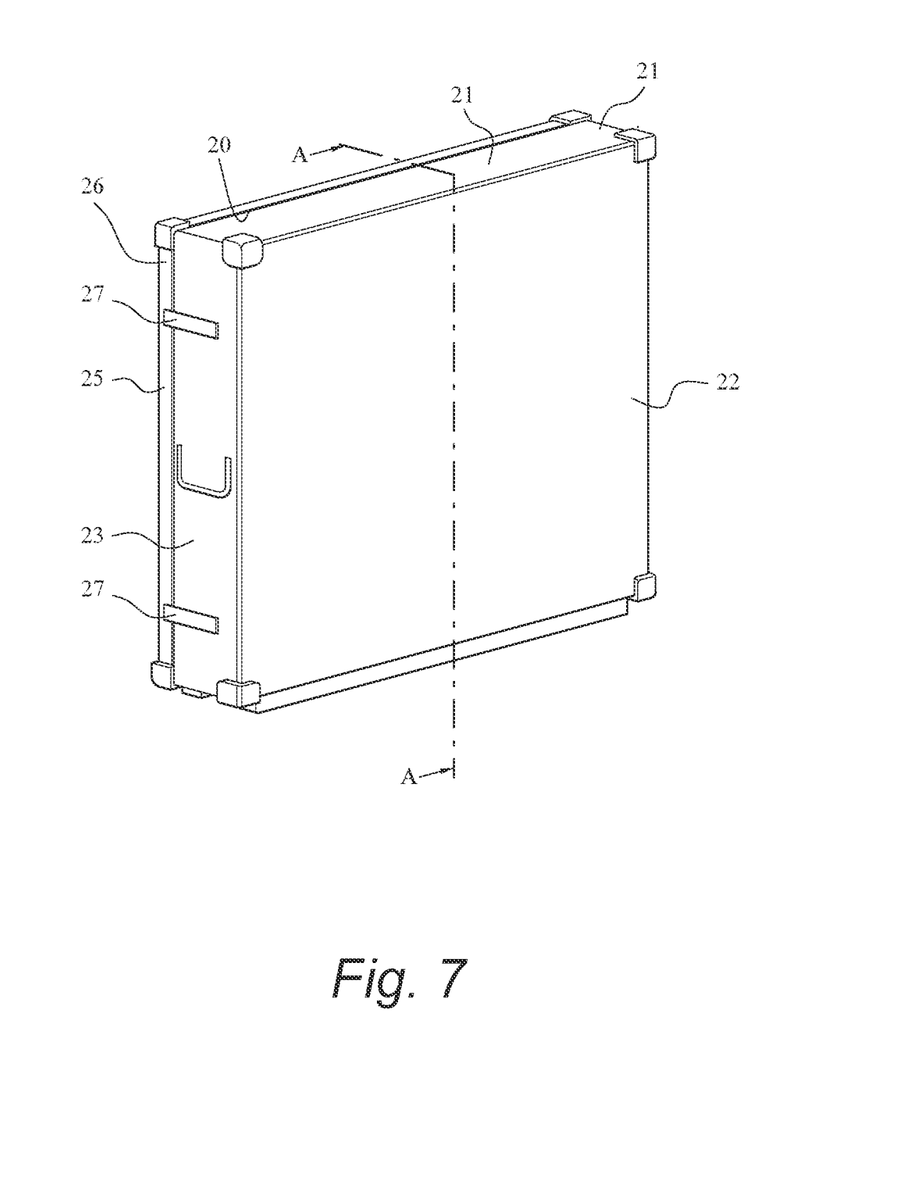

FIG. 7 shows a shipping container (20) for transporting works of art having an enclosing section (21) comprising of a flat rectangular wall segment (22) and four wall sections (23) adjoining said flat wall segment (22). The flat wall segment (22) and the four wall sections (23) define a space (24) for the works of art to be transported. Also a cover section (25) comprising a flat rectangular wall (26) and retaining means (27) are shown to secure the cover section (25) to the wall sections (23) of the enclosing section (21).

Figure 8:
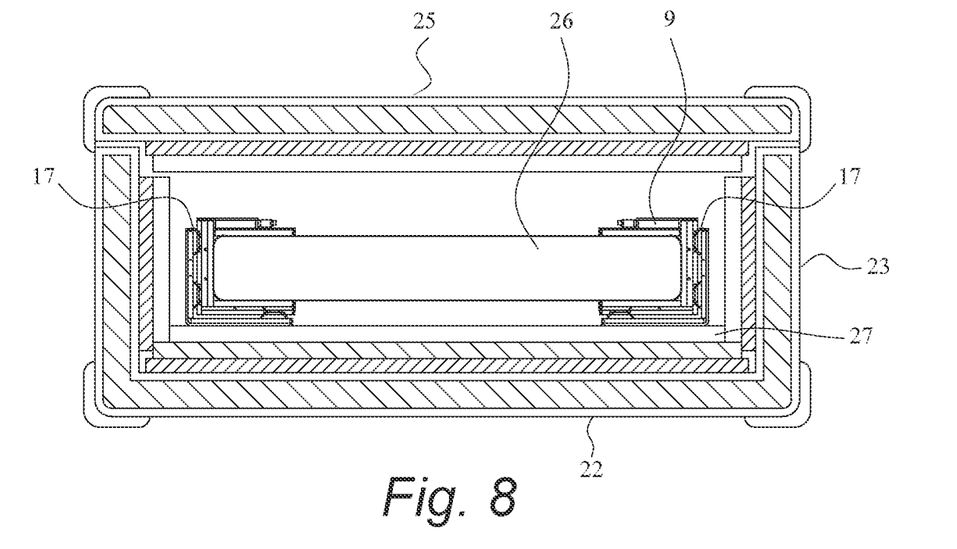

FIG. 8 shown a cross sectional view AA' of the shipping container (20) of FIG. 7. As shown two corner support elements (17) according to FIG. 5-6 are shown which hold a work of art (26). The base element of the support elements may be fixed to the flat rectangular wall segment (22) by a hook and loop type connection (27) or by means of a bolted connection. As shown the clamping element (9) of the support elements (17) is spaced apart from the cover section (25).

The invention claimed is:

1. A support for a work of art, comprising:
    a base element for fixing the support to an interior wall of a shipping container; and
    a clamping element for clamping the work of art, wherein the base element and the clamping element are fixed to each other by wire rope isolators,
    wherein the base element has a cross-section in a shape of a L and comprises of a base wall part and an upright wall part, wherein the clamping element has a cross-section in a shape of a L and comprises of a base wall part and an upright wall part, wherein the base wall part of the base element and the base wall part of the clamping element are fixed to each other by one or more wire rope isolators, and wherein the upright wall part of the base element and the upright wall part of the clamping element are fixed to each other by one or more wire rope isolators, and
    wherein the clamping element is provided with a clamp which may be fixed to the upright wall part of the clamping element at varying distances from the base wall part of the clamping element.

2. The support according to claim 1, wherein the base element and the clamping element can move in six degrees of freedom relative to each other.

3. The support according to claim 1, wherein the wire rope isolators comprise two mounting blocks, each mounting block provided with two parallel passages for a wire rope which wire rope spaces the blocks apart and wherein the wire rope is secured in the passages to the mounting blocks.

4. The support according to claim 1, wherein the distance between the base wall part of the base element and the base wall part of the clamping element is between 1.5 cm and 12 cm and wherein the distance between the upright wall part of the base element and the upright wall part of the clamping element is between 1.5 cm and 12 cm.

5. The support according to claim 4, wherein the base wall part of the base element and the base wall part of the clamping element are fixed to each other by 1 to 5 square wire rope isolators and wherein the upright wall part of the base element and the upright wall part of the clamping element are fixed to each other by 1 to 5 square wire rope isolators.

6. The support according to claim 1, wherein the base wall part of the base element has a rectangular shape, the base wall part of the clamping element has a rectangular shape, the upright wall part of the base element has a rectangular shape, and the upright wall part of the clamping device has a rectangular shape.

7. The support according to claim 6, wherein to the base wall part and the upright wall part of the clamping element a third wall part is fixed such to form a corner element to support a corner of the work of art.

8. The support according to claim 7, wherein the L-shaped clamping element has two ends and the third wall part is releasably fixed to one of the two ends of the L-shaped clamping element.

9. The support according to claim 1, wherein the clamping element is provided with a cushion material for supporting the work of art.

10. A shipping container for transporting a work of art, comprising:
    an enclosing section comprising a flat rectangular wall segment and four wall sections adjoining said flat wall segment, wherein the flat wall segment and the four adjoining wall sections define a space for the work of art to be transported;
    a cover section comprising a flat rectangular wall;
    retaining means to secure the cover section to the four adjoining wall sections of the enclosing section; and
    three or more supports each including:
        a base element for fixing the respective support to an interior wall of the shipping container; and
        a clamping element for clamping the work of art, and wherein the base element and the clamping element are fixed to each other by wire rope isolators,
    wherein the base element of each of the supports is fixed to the flat rectangular wall segment, and wherein the clamping element of each of the supports is spaced apart from the cover section when the cover section is secured to the adjoining wall sections.

11. The shipping container according to claim 10, wherein the base element has a cross-section in a shape of a L and comprises of a base wall part and an upright wall part, wherein the clamping element has a cross-section in a shape of a L and comprises of a base wall part and an upright wall part, wherein the base wall part of the base element and the base wall part of the clamping element are fixed to each other by one or more said wire rope isolators, and wherein the upright wall part of the base element and the upright wall part of the clamping element are fixed to each other by one or more wire rope isolators.

12. The shipping container according to claim 11, wherein the clamping element is provided with a clamp which may be fixed to the upright wall part of the clamping element at varying distances from the base wall part of the clamping element.

13. The shipping container according to claim 10, wherein the base elements are fixed to the flat rectangular wall segment by a hook and loop type connection.

14. A support for a work of art, comprising:
- a base element for fixing the support to an interior wall of a shipping container; and
- a clamping element for clamping the work of art, wherein the base element and the clamping element are fixed to each other by wire rope isolators,
- wherein the base element has a cross-section in a shape of a L and comprises of a base wall part and an upright wall part, wherein the clamping element has a cross-section in a shape of a L and comprises of a base wall part and an upright wall part, wherein the base wall part of the base element and the base wall part of the clamping element are fixed to each other by one or more wire rope isolators, and wherein the upright wall part of the base element and the upright wall part of the clamping element are fixed to each other by one or more wire rope isolators,
- wherein the base wall part of the base element has a rectangular shape, the base wall part of the clamping element has a rectangular shape, the upright wall part of the base element has a rectangular shape, and the upright wall part of the clamping device has a rectangular shape,
- wherein to the base wall part and the upright wall part of the clamping element a third wall part is fixed such to form a corner element to support a corner of the work of art, and
- wherein the L-shaped clamping element has two ends and the third wall part is releasably fixed to one of the two ends of the L-shaped clamping element.

* * * * *